W. WOLZ & J. V. PAXSON.
EGG CRATE.
APPLICATION FILED APR. 8, 1914.
1,141,167.
Patented June 1, 1915.
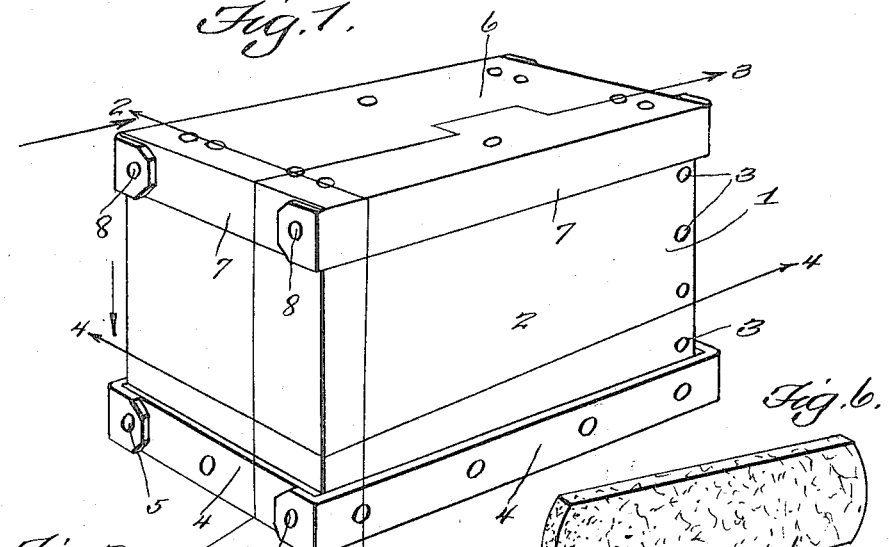
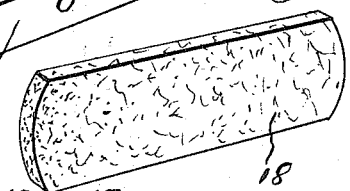
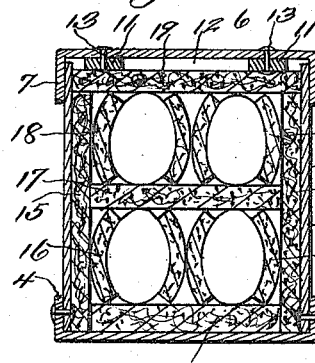
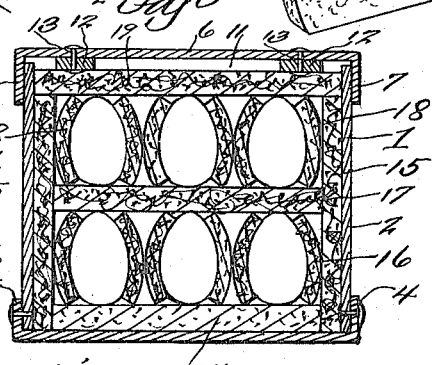
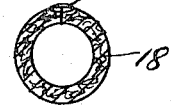
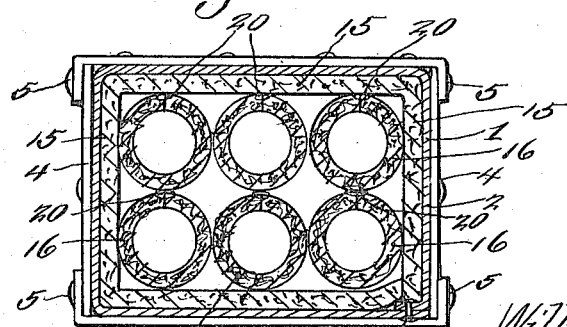
Witnesses
A. R. Wolfe,
Francis T. Boswell,
Inventors
William Wolz, and
Jonathan V. Paxson
By D. Swift &C.,
his Attorneys

UNITED STATES PATENT OFFICE.

WILLIAM WOLZ AND JONATHAN V. PAXSON, OF THREE OAKS, MICHIGAN.

EGG-CRATE.

1,141,167.           Specification of Letters Patent.       Patented June 1, 1915.

Application filed April 8, 1914. Serial No. 830,435.

*To all whom it may concern:*

Be it known that we, WILLIAM WOLZ and JONATHAN V. PAXSON, citizens of the United States, residing at Three Oaks, in the county of Berrien and State of Michigan, have invented a new and useful Egg-Crate; and we do hereby declare the following to be a full, clear, and exact description of the invention, such as will enable others skilled in the art to which it appertains to make and use the same.

This invention relates to a new and useful improved egg shipping crate.

An object of the invention is the provision of a crate provided with tiers of egg holders. In other words, each tier has a plurality of individual egg holders, each constructed of thick felt, corresponding substantially to the shape of the egg, for example tapering from end to end.

Another feature of the invention is the provision of felt divisions, dividing the tiers from one another.

In practical fields the detail of construction may necessitate alterations, falling within the scope of what is claimed.

The invention comprises further features and combination of parts, as hereinafter set forth, shown in the drawings and claimed.

In the drawings:—Figure 1 is a view in perspective of the improved crate, showing the same closed. Fig. 2 is a transverse sectional view on line 2—2 of Fig. 1. Fig. 3 is a longitudinal sectional view on line 3—3 of Fig. 1. Fig. 4 is a detail view of one of the egg holders. Fig. 5 is a horizontal sectional view on line 4—4 of Fig. 1. Fig. 6 is a detail view of one of the strips for forming either one of the egg holders 16 or 18.

Referring more especially to the drawings, 1 designates the crate, which may be constructed of any suitable material, such as heavy cardboard or other similar composition material. As will be noted the body of the shipping crate or box is constructed of a single piece, bent to form a rectangular contour as shown, and riveted together as shown at 3. This body portion is designated by the numeral 2. The bottom is constructed from a single piece of material, cut to form flanges 4, which are bent to overlie the body, and riveted thereto as shown at 5. The top 6 is similarly constructed, but the flanges 7 of the top are not riveted to the body of the crate. However, the longitudinal side flanges have their ends riveted at 8 to the end flanges. The under surface of the top is provided with longitudinal and transverse strips 11 and 12, riveted in place as shown at 13. A strip of felt 14 corresponding in shape to the contour of the crate is first placed in the bottom of the crate. An elongated strip of felt 15 is arranged in the crate adjacent the longitudinal sides and the ends of the crate, in the manner shown in Fig. 5. A series of felt egg holders 16 is then placed upon the strip of felt 14 of the bottom, and upon the holders 16 an area of felt 17 is arranged, on which another tier of egg holders is disposed, designated by the character 18. On the second tier of egg holders a third area of felt 19 is disposed, which is held in place by the strips 11 and 12 and the cover. Each egg holder comprises a strip of felt, so shaped that when the same is turned in a roll, as shown, the holder tapers from end to end, thereby assisting in preventing endwise movement of the egg. The ends of the strips from which each holder is constructed are stitched together, as indicated at 20. By the provision of the surrounding wall of the felt and the intermediate pieces of felt, and the felt holders, a dozen or more eggs may be shipped by express, or parcel post, or otherwise in first-class condition, such arrangement of felt preventing jolting of the eggs and contact between them, as well as endwise movement.

The invention having been set forth, what is claimed as new and useful is:—

1. In combination with a shipping crate, a lining of padding adjacent its interior surface, tiers of egg holders arranged inside of said padding and provided with an intermediate padding, each holder comprising a strip of felt having its ends stitched together, said strip being elongated and having its ends curved so that when said ends are so stitched, the holder corresponds substantially to the shape of the egg.

2. In combination, tiers of egg holders, each holder comprising an elongated strip having its ends so curved that when the ends of said strips are connected together, the holder tapers toward each end to correspond with the shape of the egg, means for holding the ends of the strip together, and a padded crate for said holders.

In testimony whereof we have signed our names to this specification in the presence of two subscribing witnesses.

WILLIAM WOLZ.
JONATHAN V. PAXSON.

Witnesses:
ARTHUR E. SCHMUHL,
CHAS. O. HESS.

Copies of this patent may be obtained for five cents each, by addressing the "Commissioner of Patents, Washington, D. C."